(12) United States Patent
Okita et al.

(10) Patent No.: US 8,643,811 B2
(45) Date of Patent: Feb. 4, 2014

(54) LIQUID CRYSTAL SHUTTER COMPONENT AND LIQUID CRYSTAL SHUTTER

(75) Inventors: Mitsutaka Okita, Hakusan (JP); Kazuhiro Nishiyama, Kanazawa (JP)

(73) Assignee: Japan Display Inc., Fukaya-shi (JP)

(*) Notice: Subject to any disclaimer, the term of this patent is extended or adjusted under 35 U.S.C. 154(b) by 125 days.

(21) Appl. No.: 13/432,564

(22) Filed: Mar. 28, 2012

(65) Prior Publication Data

US 2012/0257125 A1  Oct. 11, 2012

(30) Foreign Application Priority Data

Apr. 8, 2011  (JP) .................................. 2011-086122

(51) Int. Cl.
*G02F 1/1335*  (2006.01)
(52) U.S. Cl.
USPC ............................................ 349/119; 349/13
(58) Field of Classification Search
USPC ............................................. 349/119, 13, 15
See application file for complete search history.

(56) References Cited

U.S. PATENT DOCUMENTS 6,693,693 B1  2/2004  Okita et al.
2009/0066863 A1*  3/2009  Chen ............................... 349/13

FOREIGN PATENT DOCUMENTS

JP  8-327961  12/1996

* cited by examiner

*Primary Examiner* — Wen-Ying P Chen
(74) *Attorney, Agent, or Firm* — Oblon, Spivak, McClelland, Maier & Neustadt, L.L.P.

(57) ABSTRACT

According to one embodiment, a liquid crystal shutter component includes a first polarizer, a second polarizer, a liquid crystal layer, a first retardation layer, a second retardation layer, a third retardation layer and a fourth retardation layer. A liquid crystal orientation of the liquid crystal layer transitions between a plurality of bend orientation states. The retardation in the direction along the plane of the second retardation layer and the fourth retardation layer is 20 nm or more and 120 nm or less. The retardation along the first direction of the second retardation layer and the fourth retardation layer is 40 nm or more and 140 nm or less.

2 Claims, 5 Drawing Sheets

LIQUID CRYSTAL SHUTTER COMPONENT AND LIQUID CRYSTAL SHUTTER

CROSS-REFERENCE TO RELATED APPLICATIONS

This application is based upon and claims the benefit of priority from prior Japanese Patent Application No. 2011-086122, filed Apr. 8, 2011, the entire contents of which are incorporated herein by reference.

FIELD

Embodiments described herein relate generally to a liquid crystal shutter component and a liquid crystal shutter.

BACKGROUND

The liquid crystal is widely used for display apparatus and has a function of controlling a light transmittance by an electronic signal. The liquid crystal, using the above-mentioned function, can switch its states between light transmission and light shielding. The liquid crystal is applied for various types of shutters for, for example, liquid crystal shutter glasses.

The liquid crystal shutter glasses are used in the stereoscopic system which has been advancing in the practical application to such fields as entertainment, education, broadcasting and medical science, in particular. The liquid crystal shutter glasses display in time division left-eye images and right-eye images which correspond to parallax between the right and left eyes.

There is a demand that the liquid crystal shutter glasses used in the stereoscopic system function as a shutter having a high-speed responsiveness. Liquid crystal shutters including such liquid crystal shutter glasses still have room for improvement in terms of display performance.

DETAILED DESCRIPTION

Figure 1:
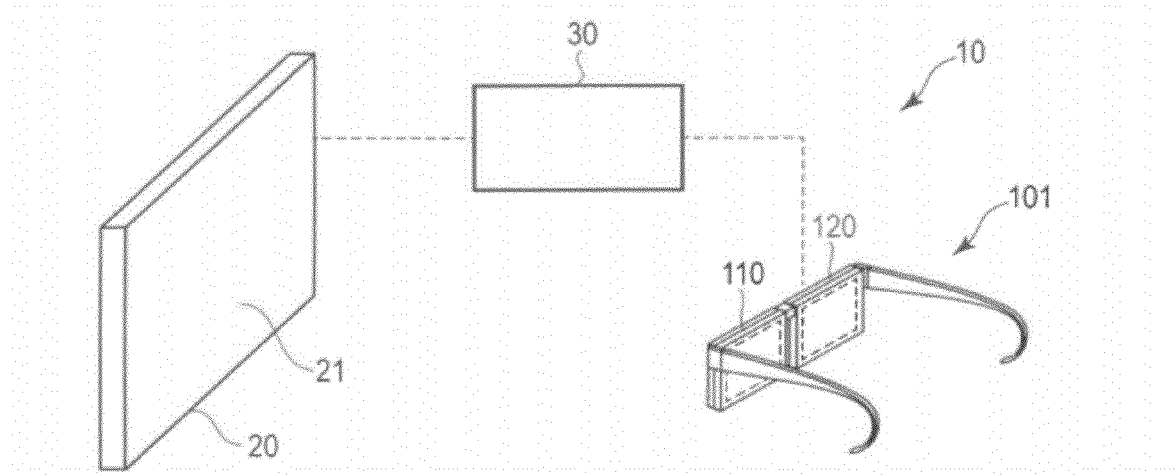
FIG. 1 is a schematic view showing an example of the structure of a stereoscopic image display system which uses a liquid crystal shutter component of the first embodiment.

In general, according to one embodiment, there is provided a liquid crystal shutter component comprising: a first polarizer; a second polarizer; a liquid crystal layer; a first retardation layer; a second retardation layer; a third retardation layer; and a fourth retardation layer. The liquid crystal layer is provided between the first polarizer and the second polarizer. The first retardation layer is provided between the first polarizer and the liquid crystal layer. The second retardation layer is provided between the first polarizer and the first retardation layer. The third retardation layer is provided between the second polarizer and the liquid crystal layer. The fourth retardation layer is provided between the second polarizer and the third retardation layer. The projection axis of the longitudinal axis of the liquid crystal molecule of the liquid crystal layer to a plane perpendicular to the first direction directed from the second polarizer to the first polarizer goes along the second direction perpendicular to the first direction. The liquid crystal orientation of the liquid crystal layer transitions between a plurality of bend orientation states different from each other, created depending on the voltages applied to the liquid crystal layer. The acute angle made by the first absorbing axis of the first polarizer and the second direction is equal to the acute angle made by the third direction perpendicular to both of the first direction and the second direction, and the first absorbing axis. The second absorbing axis of the second polarizer is perpendicular to the first absorbing axis. The projection axis to the plane of the slow axis of the first retardation layer is perpendicular to the second direction. The projection axis to the plane of the slow axis of the third retardation layer is perpendicular to the second direction. The projection axis to the plane of the slow axis of the second retardation layer is perpendicular to the first absorbing axis. The retardation in the direction along the plane of the second retardation layer is 20 nm or more and 120 nm or less. The retardation along the first direction of the second retardation layer is 40 nm or more and 140 nm or less. The projection axis to the plane of the slow axis of the fourth retardation layer is perpendicular to the second absorbing axis. The retardation in the direction along the plane of the fourth retardation layer is 20 nm or more and 120 nm or less. The retardation along the first direction of the fourth retardation layer is 40 nm or more and 140 nm or less.

Embodiments will now be described with reference to accompanying drawings.

The drawings are schematic or conceptual and therefore the relationship between the thickness and width in each part, the ratio in size between parts, etc. are not necessarily identical to those practically carried out. Further, the same part may be illustrated in different dimensions or proportions from one drawing to another.

It should also be noted that the same element described in the specification of the present application or illustrated in drawings as those already described or illustrated will be designated by the same reference symbol, and the detailed description therefore will be omitted if not particularly necessary.

(First Embodiment)

FIG. 1 is a schematic view showing an example of the structure of a stereoscopic image display system which uses a liquid crystal shutter component of the first embodiment.

Figure 2:
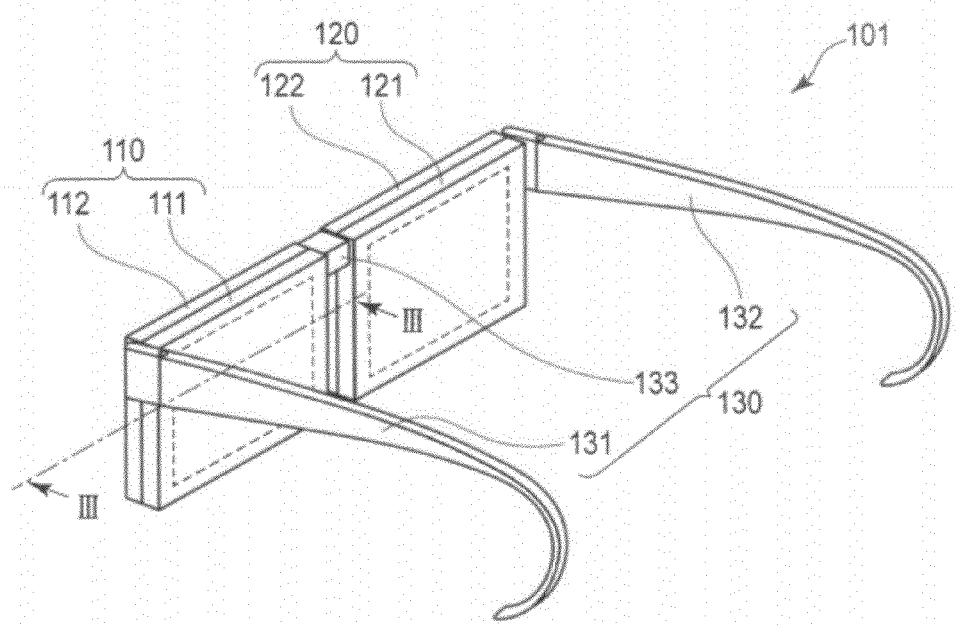
FIG. 2 is a schematically perspective view showing an example of the structure of liquid crystal shutter glasses which use the liquid crystal shutter component of the first embodiment.

FIG. 2 is a schematically perspective view showing an example of the structure of liquid crystal shutter glasses which use the liquid crystal shutter component of the first embodiment.

Figure 3:
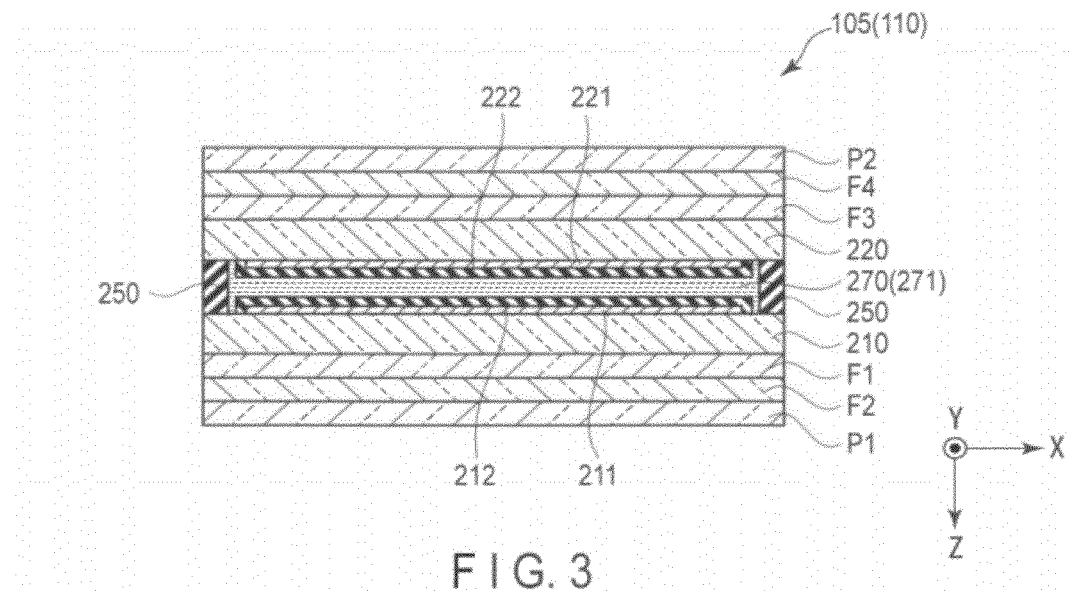
FIG. 3 is a cross sectional view schematically showing an example of the structure of the liquid crystal shutter component of the first embodiment.

FIG. 3 is a cross sectional view schematically showing an example of the structure of the liquid crystal shutter component of the first embodiment.

First, with reference to FIG. 1, the outline of the stereoscopic image display system which uses the liquid crystal shutter component of the embodiment will now be described.

As shown in FIG. 1, a stereoscopic image display system 10 comprises a display apparatus 20 and liquid crystal shutter glasses 101. The liquid crystal shutter glasses 101 comprises a liquid crystal shutter component (left-eye liquid crystal shutter component) 110 and a liquid crystal shutter component (right-eye liquid crystal shutter component) 120. The liquid crystal shutter component 110 and the liquid crystal shutter component 120 are aligned with each other side by side.

The liquid crystal shutter component 110 is designed to face the left eye of the viewer, whereas the liquid crystal shutter component 120 is designed to face the right eye of the viewer. The viewer views images displayed on the display apparatus 20 through the liquid crystal shutter glasses 101.

The stereoscopic image display system 10 has a 3-dimensional image display mode. In the 3-dimensional image display mode, images for the left eye and images for the right eye, created based on the parallax of viewers are displayed alternately on a screen 21, and the liquid crystal shutter glasses 101 carries out the switching operations in accordance with the switching between the left-eye images and right-eye images. In this manner, the images are alternately displayed for the left and right eyes of the viewer. The left-eye images are displayed for the left eye of the viewer. The right-eye images are displayed for the right eye of the viewer. It should be noted here that the stereoscopic image display system 10 may have an operation mode in which an image displayed on the screen 21 is observed as a 2-dimensional image by the viewer. The following description will be made in connection with the 3-dimensional image display mode.

The display apparatus 20 comprises the screen 21. Images to be viewed by the viewer are displayed on the screen 21. As the display apparatus 20, for example, an active matrix type liquid crystal display is used. It should be noted here that the embodiment is not limited to this, but a display having an arbitrary structure can be used as the display apparatus 20. In the display apparatus 20, images having, for example, a field frequency of 120 Hz are displayed.

On the screen 21, the left-eye images and right-eye images are displayed while they are alternately switched for each field. During the period in which the left-eye images are displayed, the liquid crystal shutter component 110 is set in a light transmission state, whereas the liquid crystal shutter component 120 is set in a light shielding state. On the other hand, during the period in which the right-eye images are displayed, the liquid crystal shutter component 120 is set in a light transmission state, whereas the liquid crystal shutter component 110 is set in a light shielding state. It should be noted that the light transmission state is a state in which the light transmittance is higher than the light transmittance of the light shielding state, and the light shielding state is a state in which the light transmittance is lower than the light transmittance of the light transmission state. It is desired that the rate (contrast ratio) of the light transmittance of the light transmission state to the light transmittance of the light shielding state should be increase. When the contrast ration is increase, the left-eye images and right-eye images being mixedly sensed is suppressed, thereby making it possible to obtain an easy-to-view display.

The stereoscopic image display system 10 may further comprise a controller 30. The controller 30 can control the operation of the liquid crystal shutter glasses 101. It should be noted here that the function of the controller 30 may be included in either one of the display apparatus 20 and the liquid crystal shutter glasses 101. The transmission and reception of signals between the controller 30 and the display apparatus 20, the transmission and reception of signals between the controller 30 and the liquid crystal shutter glasses 101, and the transmission and reception of signals between the display apparatus 20 and the liquid crystal shutter glasses 101 are performed by a wired or wireless method.

As shown in FIG. 2, in this specific example, the liquid crystal shutter component 110 comprises a first substrate module (the left-side first substrate module) 111, a second substrate module (the left-side second substrate module) 112, and a left-side liquid crystal layer (not shown) provided between the first substrate module 111 and the second substrate module 112.

On the other hand, the liquid crystal shutter component 120 comprises a first substrate module (the right-side first substrate module) 121, a second substrate module (the right-side second substrate module) 122, and a right-side liquid crystal layer (not shown) provided between the first substrate module 121 and the second substrate module 122.

Here, for example, the first substrate module 121 and the first substrate module 122 may be provided to be continuous. The second substrate module 112 and the second substrate module 122 may be provided to be continuous. The left-side liquid crystal layer and the right-side liquid crystal layer may be provided to be continuous. But, to the left-side liquid crystal layer, a voltage independent from another voltage to be applied to the right-side liquid crystal layer can be applied. Examples of the structures of the liquid crystal shutter component 110 and the liquid crystal shutter component 120 will be described later.

The liquid crystal shutter glasses 101 of the embodiment may further comprise a holder 130 (frame) in addition to the liquid crystal shutter component 110 and the liquid crystal shutter component 120. The holder 130 hold the liquid crystal shutter component 110 and the liquid crystal shutter component 120.

The holder 130 comprises, for example, a left-side ear hook member 131 and a right-side ear hook member 132. With these members, the viewer can easily wear the liquid crystal shutter glasses 101. The left-side ear hook member 131 and right-side ear hook member 132 may be provided in accordance with necessity. Meanwhile, when the liquid crystal shutter component 110 and the liquid crystal shutter component 120 are separate from each other, the holder 130 is provided with a connector 133 which connects a portion of the liquid crystal shutter component 110 and a portion of the liquid crystal shutter component 120 to each other.

The structure of the liquid crystal shutter component 110, for example, may be made the same as that of the liquid crystal shutter component 120. Or the structure of the liquid crystal shutter component 110 may be formed, for example, to be bilaterally symmetrical with respect to the liquid crystal shutter component 120. In the following description, an example of the structure of a liquid crystal shutter component which gives rise to either one of the liquid crystal shutter component 110 and the liquid crystal shutter component 120 will be described.

FIG. 3 is a cross section taken along the line III-III shown in FIG. 2.

This figure shows an example of the structure of a liquid crystal shutter component 105 which gives rise to the liquid crystal shutter component 110. Note that as will be later explained, the structure of the liquid crystal shutter component 105 can be applied to the liquid crystal shutter component 120 as well.

As shown in FIG. 3, the liquid crystal shutter component 105 comprises a first polarizer P1 (a first polarizing layer), a second polarizer P2 (a second polarizing layer), a liquid crystal layer 270 (for example, a first liquid crystal layer 271), a first retardation layer F1, a second retardation layer F2, a third retardation layer F3 and a fourth retardation layer F4.

The second polarizer P2 faces the first polarizer P1.

The liquid crystal layer 270 is provided between the first polarizer P1 and the second polarizer P2.

The first retardation layer F1 is provided between the first polarizer P1 and the liquid crystal layer 270.

The second retardation layer F2 is provided between the first polarizer P1 and the first retardation layer F1.

The third retardation layer F3 is provided between the second polarizer P2 and the liquid crystal layer 270.

The fourth retardation layer F4 is provided between the second polarizer P2 and the third retardation layer F3.

In this specific example, the first substrate 210 is provided between the first retardation layer F1 and the liquid crystal layer 270, and the second substrate 220 is provided between the third retardation layer F3 and the liquid crystal layer 270. In other words, the liquid crystal layer 270 is provided between the first substrate 210 and the second substrate 220. For example, a glass substrate is used for each of the first substrate 210 and the second substrate 220. Alternatively, for the first substrate 210 and the second substrate 220, a plastic substrate, for example, may be used.

The first substrate 210 and the second substrate 220 may be omitted. For example, it is possible that the first retardation layer F1 also functions as the first substrate 210 and the third retardation layer F3 also functions as the second substrate 220.

A first electrode 211 is provided on a major surface of the first substrate 210, whereas a second electrode 221 is provided on a major surface of the second substrate 220. The first electrode 211 faces the second electrode 221. For each of the first electrode 211 and the second electrode 221, a conductive layer having a light transmittance, such as indium tin oxide (ITO) is used.

A first alignment film 212 is provided on the first electrode 211, and it faces the second electrode 221. A second alignment film 222 is provided on the second electrode 221, and it faces the first electrode 211. For each of the first alignment film 212 and the second alignment film 222, for example, a layer which utilizes polyimide, which has an orientation to liquid crystal, is used. The first alignment film 212 and the second alignment film 222 are subjected to an alignment film treatment, for example, rubbing. It should be noted here that the first alignment film 212 and the second alignment film 222 are provided in accordance with necessity, and they can be omitted. In the above-provided description, an example in which the first alignment film 212 and the second alignment film 222 are subjected to a rubbing, was explained. However, the alignment film treatment subjected to the first alignment film 212 and the second alignment film 222 is arbitrary.

For example, the first substrate module 111 explained in the above can include the first substrate 210, the first electrode 211 and the first alignment film 212. Further, the first retardation layer F1, the second retardation layer F2 and the first polarizer P1 may be included in the first substrate module 111. Alternatively, the first retardation layer F1, the second retardation layer F2 and the first polarizer P1 may be regarded as separate members from the first substrate module 111.

For example, the second substrate module 112 can include the second substrate 220, the second electrode 221 and the second alignment film 222. Further, the third retardation layer F3, the fourth retardation layer F4 and the second polarizer P2 may be included in the second substrate module 112. Alternatively, the third retardation layer F3, the fourth retardation layer F4 and the second polarizer P2 may be regarded as separate members from the second substrate module 112.

It should be noted that a sealing member 250 is provided around the liquid crystal layer 270 between the first substrate 210 and the second substrate 220. For the sealing member 250, an adhesive such as epoxy resin is used. The liquid crystal layer 270 is formed in a space surrounded by the first substrate 210, the second substrate 220 and the sealing member 250.

Let us suppose that the direction running from the second polarizer P2 to the first polarizer P1 is a Z-axis direction (first direction).

Figures 4A, 4B, 4C:
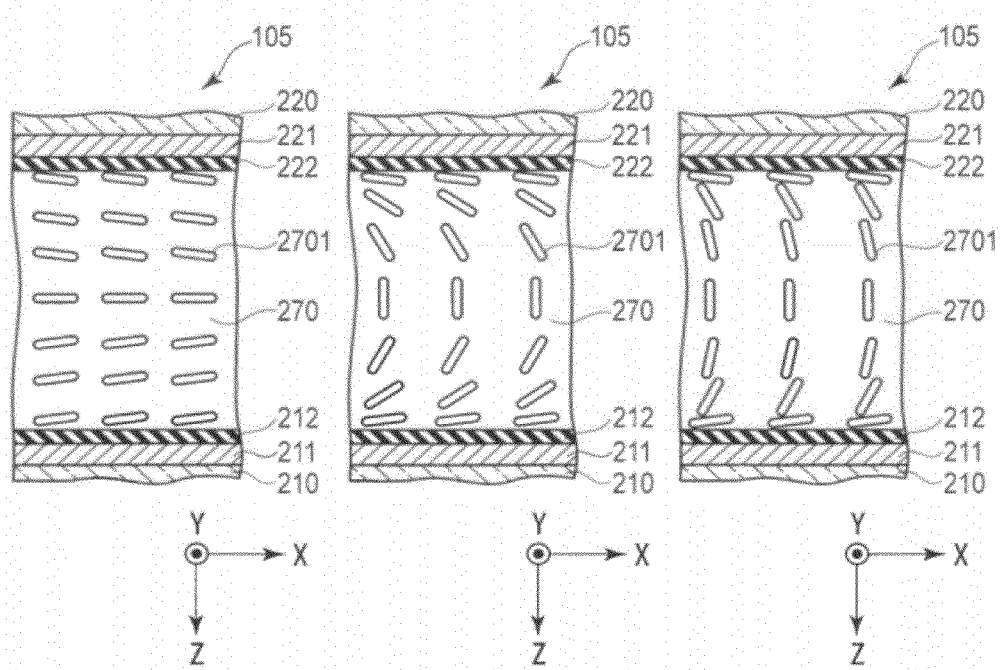
FIG. 4A is a cross sectional view schematically showing an example of the operation of the liquid crystal shutter component of the first embodiment.
FIG. 4B is a cross sectional view schematically showing another example of the operation of the liquid crystal shutter component of the first embodiment.
FIG. 4C is a cross sectional view schematically showing still another example of the operation of the liquid crystal shutter component of the first embodiment.

FIG. 4A is a cross sectional view schematically showing an example of the operation of the liquid crystal shutter component of the first embodiment, FIG. 4B is a cross sectional view schematically showing another example of the operation of the liquid crystal shutter component of the first embodiment, and FIG. 4C is a cross sectional view schematically showing still another example of the operation of the liquid crystal shutter component of the first embodiment.

In other words, these figures show examples of the state of the liquid crystal layer 270.

FIG. 4A corresponds to a non-operation state (for example, the case where a voltage applied to the liquid crystal layer 270 is 0 volt); FIG. 4B corresponds to a state where a first voltage is applied to the liquid crystal layer 270 while in operation; and FIG. 4C corresponds to a state where a second voltage is applied to the liquid crystal layer 270 while in operation. The effective value of the second voltage is higher than the effective value of, for example, the first voltage.

As shown in FIG. 4A, for example, the structure of n cell is employed for the liquid crystal layer 270. That is, in the non-operation state, the longitudinal axis of a liquid crystal molecule 2701 of the liquid crystal layer 270 goes along the X-axis direction. For example, the alignment film treatment direction (for example, rubbing direction) of the first alignment film 212 is the X-axis direction, and the alignment film treatment direction (for example, rubbing direction) of the second alignment film 222 is the X-axis direction. That is, the alignment film treatment direction of the first alignment film 212 and the alignment film treatment direction of the second alignment film 222 are parallel with each other and directed in the same direction. In other words, the alignment film treatment direction of the first alignment film 212 and the alignment film treatment direction of the second alignment film 222 are not antiparallel (180 degrees) to each other. It should be noted that it suffices only if the alignment film treatment direction of the first alignment film 212 is substantially parallel with the alignment film treatment direction of the second alignment film 222. More specifically, it suffices only if the alignment film treatment direction of the first alignment film 212 is at an angle of minus 5 degrees or more but plus 5 degrees or less with respect to the alignment film treatment direction of the second alignment film 222.

In the non-operation state, the liquid crystal molecule 2701 is titled with respect to the first substrate 210 (the first alignment film 212) by a predetermined pre-tilt angle (angle between the major surface of the first substrate 210 and the longitudinal direction of the liquid crystal molecule 2701) in the vicinity of the first substrate 210 (the first alignment film 212). Similarly, in the non-operation state, the liquid crystal molecule 2701 is titled with respect to the second substrate 220 (the second alignment film 222) by a predetermined pre-tilt angle (angle between the major surface of the second substrate 220 and the longitudinal direction of the liquid crystal molecule 2701) in the vicinity of the second substrate 220 (the second alignment film 222). That is, in the non-operation state, the orientation state of the liquid crystal layer 270 is a splay orientation. In the splay orientation, the longitudinal axis of the liquid crystal molecule 2701 is substantially parallel with the major surface of the first substrate 210 and the major surface of the second substrate 220 in the central portion of the liquid crystal layer 270 in its thickness direction. That is, the longitudinal axis of the liquid crystal molecule 2701 is substantially perpendicular to the Z-axis direction.

On the other hand, in the operation state, the orientation state of the liquid crystal layer 270 can be set in a bend orientation.

For example, in the liquid crystal shutter component 105, in order to shift from the non-operation state to the operation state, a predetermined transfer voltage is applied to the liquid crystal layer 270, and thus the process of transfer the orientation state of the liquid crystal layer 270 from the splay orientation to the bend orientation is carried out. After transfer to the bend orientation, the liquid crystal layer 270 can take a plurality of bend orientation states.

That is, as shown in FIG. 4B, in the first bend orientation obtained when the first voltage is applied to the liquid crystal layer 270, the longitudinal axis of the liquid crystal molecule 2701 is substantially parallel to the Z-axis direction in the central portion of the liquid crystal layer 270 in its thickness direction.

Meanwhile, as shown in FIG. 4C, in the second bend orientation obtained when the second voltage is applied to the liquid crystal layer 270, the longitudinal axis of the liquid crystal molecule 2701 is substantially parallel to the Z-axis direction in the central portion of the liquid crystal layer 270 in its thickness direction.

The first bend orientation and second bend orientation are different from each other in the liquid crystal molecules 2701 orientation in the region from the vicinity of the substrate of the liquid crystal layer 270 to the central portion thereof in its thickness direction. In other words, in the second bend orientation corresponding to the second voltage having a high effective value, the angle of the longitudinal axis of the liquid crystal molecules 2701 with respect to the substrate is larger than that of the first bend orientation corresponding to the first voltage having a low effective value. That is, the tilt angle of the liquid crystal molecules 2701 in the second bend orientation is larger than the tilt angle of the liquid crystal molecules 2701 in the first bend orientation.

Therefore, retardation of the liquid crystal layer 270 in the second bend orientation is less than retardation of the liquid crystal layer 270 in the first bend orientation. The change in retardation here is converted into a change in light transmittance. For example, in the first bend orientation, the liquid crystal shutter component 105 is set in the light transmitting state, whereas in the second bend orientation, the liquid crystal shutter component 105 is set in the light shielding state.

As described above, in the liquid crystal layer 270, the projection axis of the longitudinal axis of the liquid crystal molecules 2701 of the liquid crystal layer 270 with respect to a plane (X-Y plane) perpendicular to the Z-axis running from the second polarizer P2 to the first polarizer P1 goes along the second direction (X-axis direction), which is perpendicular to the Z-axis direction. The liquid crystal orientation of the liquid crystal layer 270 transitions between a plurality of bend orientation states different from each other (for example, the first bend orientation and the second bend orientation), created depending on the voltages applied to the liquid crystal layer 270.

The above-provided description was made in connection with the case where the liquid crystal has a positive dielectric anisotropy, but the liquid crystal may have a negative dielectric anisotropy. In the case where the liquid crystal has a negative dielectric anisotropy as well, the liquid crystal orientation of the liquid crystal layer 270 can transition between a plurality of bend orientation states different from each other (for example, the first bend orientation and the second bend orientation), created depending on the voltages applied to the liquid crystal layer 270.

Next, an example of the structure of the first polarizer P1, the second polarizer P2, the first retardation layer F1, the second retardation layer F2, the third retardation layer F3 and the fourth retardation layer F4 in the liquid crystal shutter component 105 of this embodiment will now be described.

Figure 5:
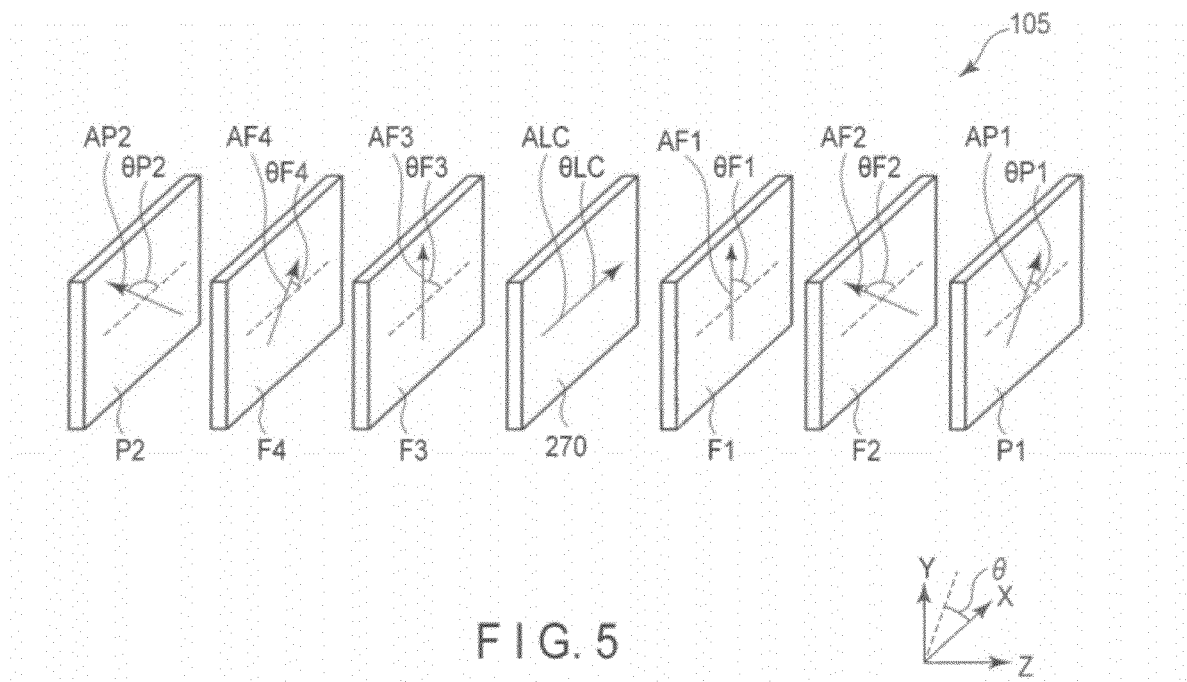
FIG. 5 is a perspective exploded view schematically showing an example of the structure of the liquid crystal shutter component of the first embodiment.

FIG. 5 is a perspective exploded view schematically showing an example of the structure of the liquid crystal shutter component of the first embodiment.

As shown in FIG. 5, the direction running from the second polarizer P2 to the first polarizer P1 is the Z-axis direction (the first direction), a direction perpendicular to the Z-axis direction is the X-axis direction (the second direction), and a direction perpendicular to the Z-axis direction and X-axis direction is the Y-axis direction (the third direction).

In the following descriptions, the angle of the optical axis in an optical component (optical layer) will be expressed by the angle with reference to the X-axis direction. In the case where the view point is set on the liquid crystal shutter component 105 from the first polarizer P1 side, the above-mentioned angle of the optical axis is an angle titled in a counter-clock wise direction from the X-axis direction.

As already explained before, the projection axis ALC of the longitudinal axis of the liquid crystal molecules 2701 of the liquid crystal layer 270 with respect to a plane (X-Y plane) perpendicular to the Z-axis goes along the X-axis direction. In other words, the liquid crystal axial angle $\theta LC$ made between the longitudinal axis of the liquid crystal molecules 2701 and the X-axis direction is 0 degree.

An angle made between a first absorbing axis AP1 of the first polarizer P1 and the X-axis direction (that is, the first absorption axial angle $\theta P1$) is substantially 45 degrees. That is, the first absorption axial angle $\theta P1$ is, for example, 40 degrees or more but 50 degrees or less. In other words, an acute angle made between the first absorbing axis AP1 of the first polarizer P1 and the X-axis direction (that is, the first absorption axial angle $\theta P1$) is substantially equal to an acute angle made between the first absorbing axis AP1 and the Y-axis direction. For example, the difference between the acute angle made between the first absorbing axis AP1 and the X-axis direction and the acute angle made between the first absorbing axis AP1 and the Y-axis direction is minus 10 degrees or larger but plus 10 degrees or less.

A second absorbing axis AP2 of the second polarizer P2 is substantially perpendicular to the first absorbing axis AP1 of the first polarizer P1. The angle made between the second absorbing axis AP2 and the first absorbing axis AP1 is, for example, 85 degrees or more but 95 degrees or less. The angle made between the second absorbing axis AP2 and the X-axis direction (that is, the second absorption axial angle θP2) is substantially 135 degrees. That is, the second absorption axial angle θP2 is, for example, 130 degrees or more but 140 degrees or less.

The projection axis to the X-Y plane of the slow axis (the first retardation axis AF1) of the first retardation layer F1 is perpendicular to the X-axis direction. For example, the angle made between the first retardation axis AF1 and the X-axis direction (the first retardation axial angle θF1) is, for example, 85 degrees or more but 95 degrees or less.

The projection axis to the X-Y plane of the slow axis (the second retardation axis AF3) of the third retardation layer F3 is perpendicular to the X-axis direction. For example, the angle made between the third retardation axis AF3 and the X-axis direction (the third retardation axial angle θF3) is, for example, 85 degrees or more but 95 degrees or less.

The projection axis to the X-Y plane of the slow axis (the second retardation axis AF2) of the second retardation layer F2 is vertical to the first absorbing axis AP1. For example, the angle made between the second retardation axis AF2 and the first absorbing axis AP1 is 85 degrees or more but 95 degrees or less. The angle made between the second retardation axis AF2 and the X-axis direction (the second retardation axial angle θF2) is, for example, 135 degrees. The second retardation axial angle θF2 is, for example, 130 degrees or more but 140 degrees or less.

The retardation in the direction along the X-Y plane of the second retardation layer F2 (that is, the retardation Re in the horizontal direction) should preferably be 20 nm or more but 120 nm or less, or more preferably, 40 nm or more but 90 nm or less.

The retardation in the direction along the Z-axis direction of the second retardation layer F2 (that is, the retardation Rth in the thickness direction (vertical direction)) should preferably be 40 nm or more but 140 nm or less, or more preferably, 60 nm or more but 120 nm or less.

The projection axis to the X-Y plane of the slow axis (the fourth retardation axis AF4) of the fourth retardation layer F4 is perpendicular to the second absorbing axis AP2. For example, the angle made between the fourth retardation axis AF4 and the second absorbing axis AP2 is 85 degrees or more but 95 degrees or less. The angle made between the fourth retardation axis AF4 and the X-axis direction (the fourth retardation axial angle θF4) is, for example, 45 degrees. The fourth retardation axial angle θF4 is, for example, 40 degrees or more but 50 degrees or less.

The retardation in the direction along the X-Y plane of the fourth retardation layer F4 (that is, the retardation Re in the horizontal direction) should preferably be 20 nm or more but 120 nm or less, or more preferably, 40 nm or more but 90 nm or less.

The retardation in the direction along the Z-axis direction of the fourth retardation layer F4 (that is, the retardation Rth in the thickness direction (vertical direction)) should preferably be 40 nm or more but 140 nm or less, or more preferably, 60 nm or more but 120 nm or less.

With the above-described structure, it is possible to provide a liquid crystal shutter component having a high display performance and liquid crystal shutter glasses.

It should be noted here that the thickness d (thickness in the Z-axis direction) of the liquid crystal layer 270 should be, for example, 3 μm or more but 7 μm or less. For example, the thickness d of the liquid crystal layer 270 should be about 4.7 μm.

The pre-tilt angle in the liquid crystal layer 270 (that is, for example, the angle of the longitudinal direction of the liquid crystal molecule 2710 with respect to the major surface of the substrate in the vicinity of the substrate of the liquid crystal layer 270 in the non-operation state where no voltage is applied to the liquid crystal layer 270) should be, for example, 5 degrees or more but 9 degrees or less. For example, the pre-tilt angle in the liquid crystal layer 270 is about 7 degrees. The pre-tilt angle in the liquid crystal layer 270 is substantially equal to the pre-tilt angle in the liquid crystal layer in the case where the directions of alignment film treatments carried out on the first alignment film 212 and the second alignment film 222 are set in antiparallel (180 degrees).

The optical axial direction (for example, the slow axis direction) of the first retardation layer F1 may be tilted with respect to the Z-axis direction.

The optical axial direction (for example, the slow axis direction) of the third retardation layer F3 may be tilted with respect to the Z-axis direction.

More specifically, as the first retardation layer F1 and the third retardation layer F3, a retardation layer in which discotic-type liquid crystals are arranged such that they gradually incline from the main surface can be used. The discotic-type liquid crystals are regarded in terms of optics as of a substantially negative uniaxial crystal. For the first retardation layer F1 and the third retardation layer F3, for example, WV Film (a product of Fuji Film Co., Ltd.) can be used.

The liquid crystal shutter component 105 of this embodiment has a structure of, for example, OCB (optically compensated bend) mode. The OCB mode has such a feature that it has an excellent high-speed response, and it is used as, for example, a direct-view-type display component (for example, the display apparatus 20 of the stereoscopic image display system 10). When the OCB mode is used for such a component as the display apparatus 20, a wide viewing angle is preferable. With regard to the liquid crystal display component which employs the OCB mode, it is known that the observation angle characteristics are compensated because the orientation state of the liquid crystal molecules 2701 of the liquid crystal layer 270 in a plane symmetry with respect to the central plane in the thickness of the liquid crystal layer 270. Further, in order to obtained a wide viewing angle in the case where the liquid crystal display component which employs the OCB mode is used for the display apparatus 20 and the like, various techniques which use retardation films are known.

On the other hand, it has not been particularly pointed out that a wide viewing angle is required in the liquid crystal shutter component 105 (for example, the liquid crystal shutter component 110 and liquid crystal shutter component 120) of the liquid crystal shutter glasses 101 used in the stereoscopic image display system 10. This is because in the liquid crystal shutter glasses 101, the liquid crystal shutter component 105 is fixated in front of each of the eyes of the viewer, and therefore the change in the angle between each eye of the viewer and the liquid crystal shutter component 105 is small. It should be noted here that in the case of a direct-view-type display apparatus, the angle between the screen of the display apparatus and each eye of the viewer greatly changes depending on the positions of the eyes of the viewer. Therefore, it has been pointed out that a wide viewing angle is required for such a case.

Here, the present inventors carried out the experiments with regard to the actual states in which the liquid crystal shutter glasses 101 is used in the stereoscopic image display system 10. According to the results of the experiments, it has been found that when the viewing angle of the liquid crystal shutter component 105 of the liquid crystal shutter glasses 101 is narrow, the displayed image (motion or still) becomes hard to view (including such a case where a heavy eye fatigue is caused).

To explain, for example, when the head portion of the viewer is located just in front of the screen while the liquid crystal shutter glasses 101 is being worn by the viewer and the pupil of the eye is facing front, the observation angle is substantially 0 degree. By contrast, even when the head portion is located just in front of the screen, if the position of the pupil is changed, then the direction of the line of sight is changed. As a result, in this case, the observation angle is not 0 degree. With regard to such a case, the following technical fact has been found. That is, on the pupils of the viewer, light passing obliquely through the liquid crystal shutter component 105 is made incident. Therefore, in the case where the observation angle characteristics of the liquid crystal shutter component 105 are poor and, for example, the contrast ratio is low in the oblique direction, the light for the left eye image or the light for the right eye image is made incident on both of the left and right eyes, thereby making it difficult to obtain a good display.

As described above, although it has not been particularly pointed out so far, a wide viewing angle is required in the liquid crystal shutter component 105 of the liquid crystal shutter glasses 101 used in the stereoscopic image display system 10.

For the liquid crystal used in the direct-view-type display apparatus, a very wide viewing angle is required. By contrast, the viewing angle of the liquid crystal shutter component 105 of the liquid crystal shutter glasses 101 may be narrower than the viewing angle of the display apparatus. In the meantime, it is particularly desired that the structure should be simple and at low cost in the liquid crystal shutter component 105 of the liquid crystal shutter glasses 101. For example, in a display apparatus involved in a high-cost product, a structure which employs a particular retardation film to obtained a very wide viewing angle can be applied. However, it is strongly requested that the structure of the liquid crystal shutter component 105 of the liquid crystal shutter glasses 101 should be at low cost, and therefore such a wide viewing angle should be achieved within this limited conditions. More specifically, as for the liquid crystal shutter component 105 of the liquid crystal shutter glasses 101, a simple and special design is required to achieve about a half a width of the viewing angle required for the above-mentioned direct-view type display apparatus at low cost.

This embodiment achieves a particular object newly found in the liquid crystal shutter component 105 of the liquid crystal shutter glasses 101. In other words, with such a simple and special design, the viewing angle characteristics of the liquid crystal shutter component 105 are improved. In this manner, this embodiment provides a liquid crystal shutter component having a high display performance and liquid crystal shutter glasses which employ such an element.

The characteristics of the liquid crystal shutter component 105 of this embodiment will now be described.

Figure 6:
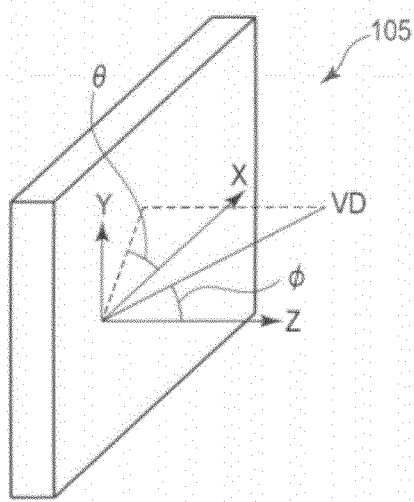
FIG. 6 is a perspective view schematically showing an example of the coordinate system used when evaluating the characteristics of the liquid crystal shutter component of the first embodiment.

FIG. 6 is a perspective view schematically showing an example of the coordinate system used when evaluating the characteristics of the liquid crystal shutter component of the first embodiment.

As shown in FIG. 6, the angle between the observation angle direction VD and the Z-axis direction in the liquid crystal shutter component 105 is defined as an observation angle $\phi$. The observation angle $\phi$ is a polar angle, and when the observation angle $\phi$ is 0 degree, it is equivalent to the case where light passes along the perpendicular direction to the main surface of the liquid crystal shutter component 105. On the other hand, the angle made between the projection axis to the X-Y plane in the observation angle direction VD and the X-axis direction is defined as an azimuth angle $\theta$. The azimuth angle $\theta$ is expressed by 0 through 360 degrees.

Figures 7A, 7B:
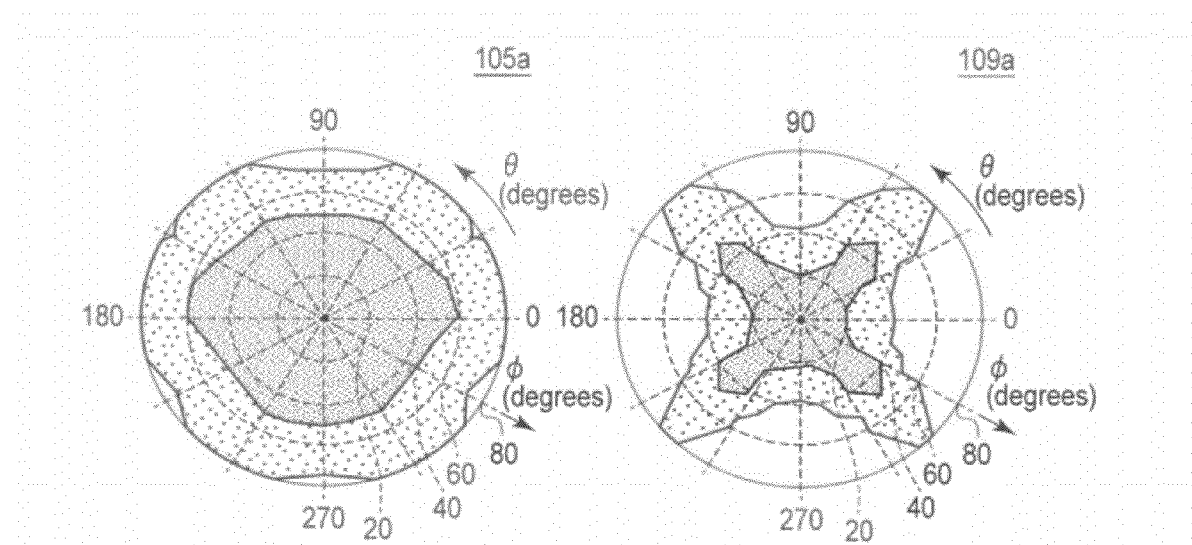
FIG. 7A is a diagram showing an example of the characteristics of the liquid crystal shutter component of the embodiment.
FIG. 7B is a diagram showing an example of the characteristics of a comparative example.

FIG. 7A and FIG. 7B are diagrams showing examples of the characteristics of the liquid crystal shutter component.

FIG. 7A corresponds to a liquid crystal shutter component 105a of the embodiment, whereas FIG. 7B corresponds to a liquid crystal shutter component 109a of the comparative example.

The structure of the liquid crystal shutter component 105a is similar to that of the liquid crystal shutter component 105. In the liquid crystal shutter component 105a, the liquid crystal axial angle $\theta$LC is 0 degree. Further, the first absorption axial angle $\theta$P1 is 45 degrees, the second absorption axial angle $\theta$P2 is 135 degrees, the first retardation axial angle $\theta$F1 is 90 degrees, and the third retardation axial angle $\theta$F3 is 90 degrees.

The second retardation axial angle $\theta$F2 is 135 degrees. The retardation within the X-Y plan of the second retardation layer F2 is 70 nm. The retardation along the Z-axis direction of the second retardation layer F2 is 100 nm.

The fourth retardation axial angle $\theta$F4 is 45 degrees. The retardation within the X-Y plan of the fourth retardation layer F4 is 70 nm. The retardation along the Z-axis direction of the fourth retardation layer F4 is 100 nm.

The thickness d of the liquid crystal layer 270 is 4.7 μm, and the pre-tilt angle in the liquid crystal layer 270 is 7 degrees.

On the other hand, the liquid crystal shutter element 109a of the comparative example has such a structure that the second retardation layer F2 and the fourth retardation layer F4 are excluded from the structure of the liquid crystal shutter component 105a. As for the liquid crystal shutter component 109a and the liquid crystal shutter component 105a, the conditions for those other than the second retardation layer F2 and the fourth retardation layer F4 (that is, the conditions for the liquid crystal layer 270, the first polarizer P1, the second polarizer P2, the first retardation layer F1 and the third retardation layer F3) are common.

Here, as to each of the liquid crystal shutter component 105a and the liquid crystal shutter component 109a, various voltages were applied to the liquid crystal layer 270, and thus the contrast ratios in various observation angle directions VD (various azimuth angles $\theta$ and various observation angles $\phi$) were obtained. The contract ratio is a value obtained by dividing the transmittance of the light transmitting state (for example, the state corresponding to the first bend orientation of the first voltage) by the transmittance of the light shielding state (for example, the state corresponding to the second bend orientation of the second voltage). Thus, in each of the view angle directions VD, the contrast value was obtained.

In each of FIGS. 7A and 7B, a plurality of concentric circles were illustrated, the innermost circle corresponding to a observation angle $\phi$ of 20 degrees, the second innermost circle corresponding to a observation angle $\phi$ of 40 degrees, the third innermost circle corresponding to a observation angle $\phi$ of 60 degrees, and the outermost circle corresponding to a observation angle $\phi$ of 80 degrees. On the other hand, the circumferential direction corresponds to azimuth angles $\theta$. In these figure, the region illustrated with light dots indicates the region where the contrast ratio is 10:1 or higher, whereas the region illustrated with dark dots indicates the region where the contrast ratio is 100:1 or higher.

As shown in FIG. 7B, in the liquid crystal shutter component 109a of the comparative example, the region where the contrast ratio is 10:1 or higher, and the region where the contrast ratio is 100:1 or higher are small.

By contrast, as shown in FIG. 7A, in the liquid crystal shutter component 105a of this embodiment, the region where the contrast ratio is 10:1 or higher, and the region where the contrast ratio is 100:1 or higher are significantly larger as compared to those of the liquid crystal shutter component 109a.

Here, the ratio of the area of the region where the observation angle φ is 80 degrees or less and the azimuth angle θ is 0 degree or larger but 360 degrees or less (that is, the area of the outermost circle in each of these figures) to the area of the region where the contrast ratio is 10:1 or higher (that is, the area of the region illustrated by light dots) is defined as the value of the range of viewing angle. The range of viewing angle of the liquid crystal shutter element 109a of the comparative example is small as 0.649. By contrast, the range of viewing angle of the liquid crystal shutter element 105a of the embodiment is so large as 0.964.

As described above, in the liquid crystal shutter component 105 (105a) of the embodiment, the second retardation layer F2 and the fourth retardation layer F4 are employed and thus the viewing angle can be enlarged. The second retardation layer F2 and the fourth retardation layer F4 are of relatively a simple structure, and therefore they can be practically used at low cost.

For at least one of the second retardation layer F2 and the fourth retardation layer F4, a biaxial film can be employed. Note that this embodiment is not limited to this. For example, for at least one of the second retardation layer F2 and the fourth retardation layer F4, such a film prepared by stacking a positive uniaxial film and a negative uniaxial film one on the other, may be used. The film may be arbitrary as long as the overall optical characteristics of the optical layer obtained by stacking a positive uniaxial film and a negative uniaxial film one on the other are set as those descried above.

So far, examples of the structure and characteristics of the liquid crystal shutter component 105, which gives rise to the liquid crystal shutter component 110, for example, were described. Note that the structure of the liquid crystal shutter component 105 may be applied to the liquid crystal shutter component 120 as well. But the structure of the liquid crystal shutter component 120 does not have to perfectly match with the structure of the liquid crystal shutter component 110. The structure of the liquid crystal shutter component 120 may be bilaterally symmetrical with respect to the liquid crystal shutter component 110.

The present inventors examined by simulation and obtained a desirable range for each of the second retardation layer F2 and the fourth retardation layer F4.

Figure 8:
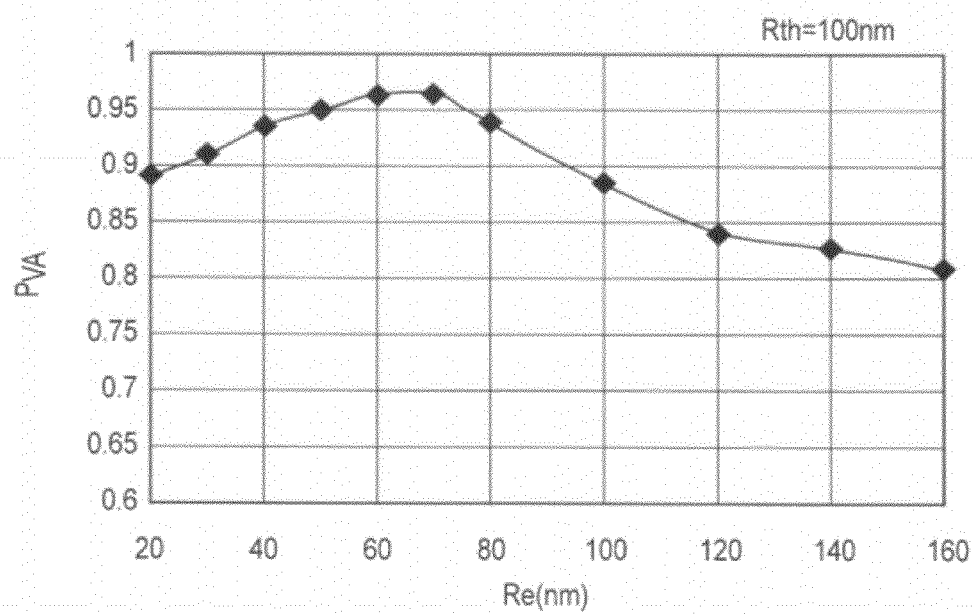
FIG. 8 is a graph showing an example of the characteristics of the liquid crystal shutter component of the first embodiment.

FIG. 8 is a graph showing an example of the characteristics of the liquid crystal shutter component of the first embodiment.

More specifically, this figure shows the results of the simulation for the range value of the viewing angle when the retardation Rth of each of the second retardation layer F2 and the fourth retardation layer F4 is set to 100 nm and the retardation Re is changed in the above-described structure. The horizontal axis indicates the retardation Re, whereas the vertical axis indicates the range value $P_{VA}$ of the viewing angle (the ratio of the area in which the contrast ratio of 10:1 or higher is obtained).

As can be understood from FIG. 8, when the retardation Re is 20 nm or more but 120 nm or less, a viewing angle range value $P_{VA}$ of about 0.83 or higher can be secured. Or when the retardation Re is 40 nm or more but 90 nm or less, a viewing angle range value $P_{VA}$ of 0.9 or higher can be secured. Thus, when the retardation Re is set to 20 nm or more but 120 nm or less, or more preferably, 40 nm or more but 90 nm or less, a high viewing angle range value $P_{VA}$ can be secured.

Further, another simulation was carried out in which the retardation Rth of each of the second retardation layer F2 and the fourth retardation layer F4 was changed within the range of this embodiment. It has been confirmed from the results of this simulation that as long as the retardation Re is maintained within the above-described range, an equivalent effect can be obtained.

Figure 9:
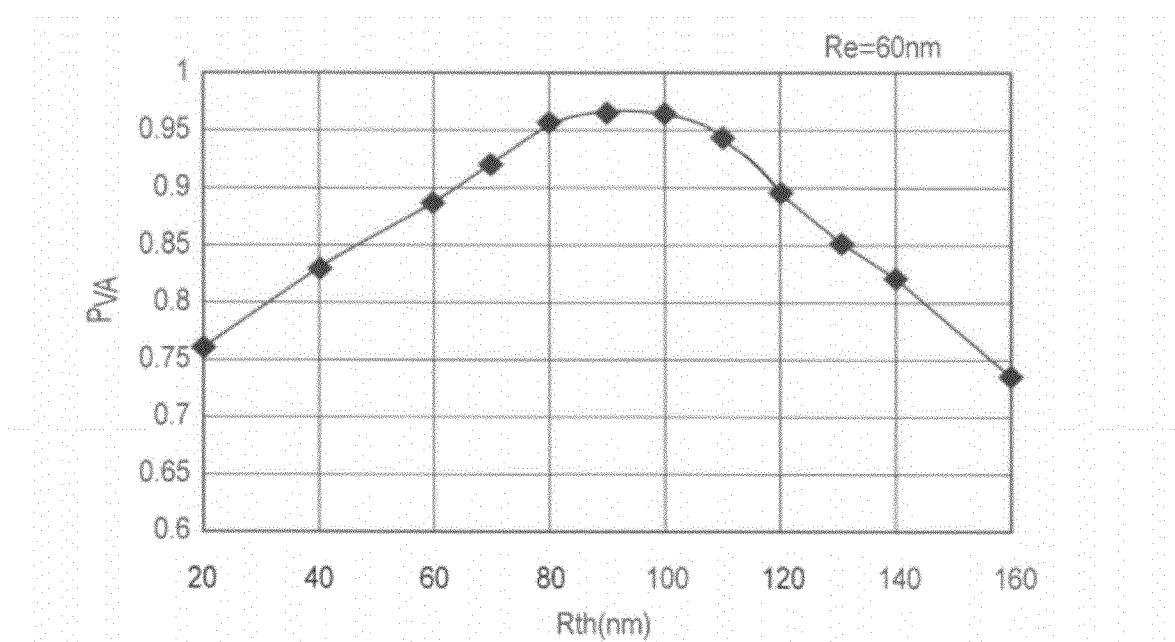
FIG. 9 is another graph showing an example of the characteristics of the liquid crystal shutter component of the first embodiment.

FIG. 9 is a graph showing an example of the characteristics of the liquid crystal shutter component of the first embodiment.

More specifically, this figure shows the results of the simulation for the range value of the viewing angle when the retardation Re of each of the second retardation layer F2 and the fourth retardation layer F4 is set to 60 nm and the retardation Rth is changed in the above-described structure. The horizontal axis indicates the retardation Rth, whereas the vertical axis indicates the range value $P_{VA}$ of the viewing angle.

As can be understood from FIG. 9, when the retardation Rth is 40 nm or more but 140 nm or less, a viewing angle range value $P_{VA}$ of about 0.83 or higher can be secured. Or when the retardation Rth is 60 nm or more but 120 nm or less, a viewing angle range value $P_{VA}$ of 0.88 or higher can be secured. Thus, when the retardation Rth is set to 40 nm or more but 140 nm or less, or more preferably, 60 nm or more but 120 nm or less, a high viewing angle range value $P_{VA}$ can be secured.

Further, another simulation was carried out in which the retardation Re of each of the second retardation layer F2 and the fourth retardation layer F4 was changed within the range of this embodiment. It has been confirmed from the results of this simulation that as long as the retardation Rth is maintained within the above-described range, an equivalent effect can be obtained.

Further, the present inventors carried out the studies on the variation in viewing angle range based on the displacement amount of the optical axis of each of the second retardation layer F2 and the fourth retardation layer F4. It has been confirmed from these studies that a viewing angle range of 0.8 or more (the ratio of area in which the contrast ratio exceeds 10) can be secured when at least within a range of ±5 degrees.

Furthermore, the present inventors carried out another simulation in which the Δnd of the liquid crystal layer (product of the birefringence index of the liquid crystal material and the thickness of the liquid crystal layer) is changed in the above-described structure. It has been confirmed from these studies that a viewing angle range of 0.9 or more can be secured even if Δnd is varied within the range of ordinary optical designing. For example, if the value of Δnd is varied by ±50 nm with respect to the set value, a viewing angle range of 0.9 or more can be secured.

(Second Embodiment)

The second embodiment is directed to liquid crystal shutter glasses 101. The liquid crystal shutter glasses 101 comprise a liquid crystal shutter component 110 and another liquid crystal shutter component 120. For the liquid crystal shutter component 110 (for example, a liquid crystal shutter component 105), the one explained in connection with the first embodiment can be employed. Therefore, the following explanation is directed to the liquid crystal shutter component 120 aligned with the liquid crystal shutter component 110 side by side.

Figure 10:
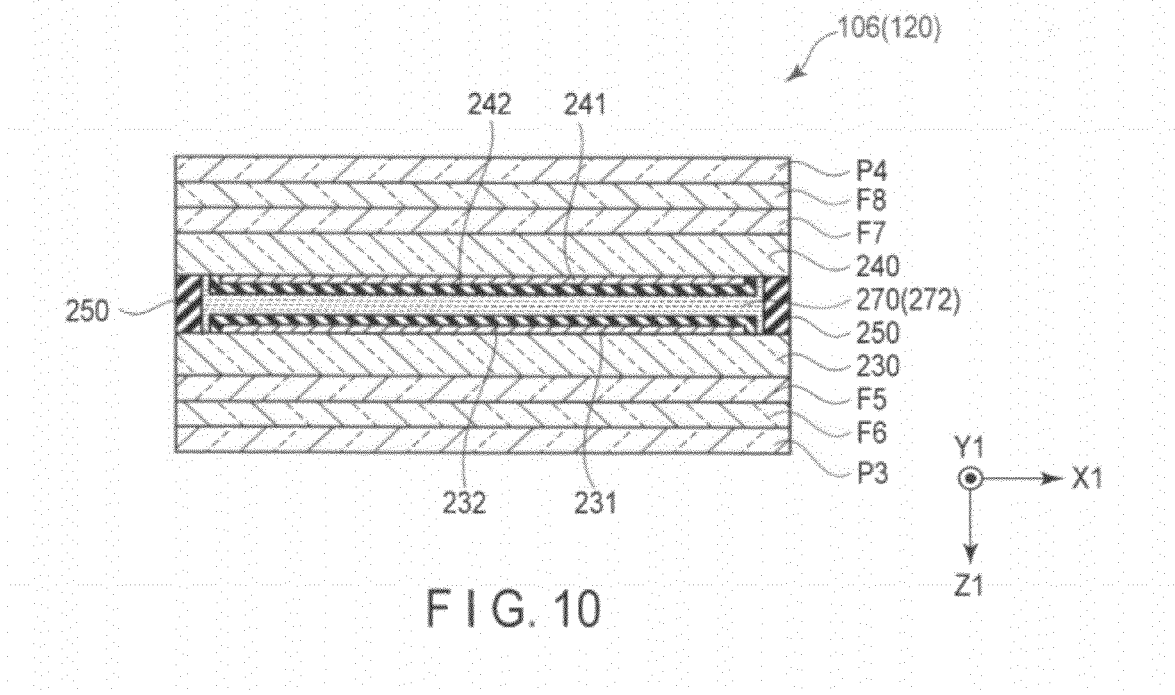
FIG. 10 is a cross sectional view schematically showing an example of the structure of the liquid crystal shutter component of liquid crystal shutter glasses of the second embodiment.

FIG. 10 is a cross sectional view schematically showing an example of the structure of the liquid crystal shutter component of liquid crystal shutter glasses of the second embodiment.

That is, this figure shows an example of the structure of the liquid crystal shutter component 120 (a liquid crystal shutter component 106).

As shown in FIG. 10, the liquid crystal shutter component 106 (the liquid crystal shutter component 120) comprises a third polarizer P3 (a third polarizing layer), a fourth polarizer P4 (a fourth polarizing layer), a second liquid crystal layer 272 (a liquid crystal layer 270), a fifth retardation layer F5, a sixth retardation layer F6, a seventh retardation layer F7 and an eighth retardation layer F8.

The fourth polarizer P4 faces the third polarizer P3.

The second liquid crystal layer 272 is provided between the third polarizer P3 and the fourth polarizer P4.

The fifth retardation layer F5 is provided between the third polarizer P3 and the second liquid crystal layer 272.

The sixth retardation layer F6 is provided between the third polarizer P3 and the fifth retardation layer F5.

The seventh retardation layer F7 is provided between the fourth polarizer P4 and the second liquid crystal layer 272.

The eighth retardation layer F8 is provided between the fourth polarizer P4 and the seventh retardation layer F7.

The projection axis of the longitudinal axis of the liquid crystal molecules of the second liquid crystal layer 272 with respect to a second plane (X1-Y1 plane) perpendicular to a fourth direction (Z1-axis direction) running from the fourth polarizer P4 to the third polarizer P3 goes along a fifth direction (X1-axis direction), which is perpendicular to the fourth direction. The liquid crystal orientation of the second liquid crystal layer 272 transitions between a plurality of bend orientation states different from each other, created depending on the voltages applied to the second liquid crystal layer 272.

In the liquid crystal shutter component 106, a third substrate 230 is provided between the fifth retardation layer F5 and the second liquid crystal layer 272, and a fourth substrate 240 is provided between the seventh retardation layer F7 and the second liquid crystal layer 272. In other words, the second liquid crystal layer 272 is provided between the third substrate 230 and the fourth substrate 240.

In this case as well, the third substrate 230 and the fourth substrate 240 may be omitted. For example, it is possible that the fifth retardation layer F5 also functions as the third substrate 230 and the seventh retardation layer F7 also functions as the fourth substrate 240.

A third electrode 231 is provided on a major surface of the third substrate 230, whereas a fourth electrode 241 is provided on a major surface of the fourth substrate 240. The third electrode 231 faces the fourth electrode 241. For each of the third electrode 231 and the fourth electrode 241, a conductive layer having a light transmittance is used.

A third alignment film 232 is provided on the third electrode 231, and it faces the fourth electrode 241. A fourth alignment film 242 is provided on the fourth electrode 241, and it faces the third electrode 231.

For example, the first substrate module 121, which was already described, can include the third substrate 230, the third electrode 231 and the third alignment film 252. Further, the fifth retardation layer F5, the sixth retardation layer F6 and the third polarizer P3 may be included in the first substrate module 121. Alternatively, the fifth retardation layer F5, the sixth retardation layer F6 and the third polarizer P3 may be regarded as separate members from the first substrate module 121.

For example, the second substrate module 122 can include the fourth substrate 240, the fourth electrode 241 and the fourth alignment film 242. Further, the seventh retardation layer F7, the eighth retardation layer F8 and the fourth polarizer P4 may be included in the second substrate module 122. Alternatively, the seventh retardation layer F7, the eighth retardation layer F8 and the fourth polarizer P4 may be regarded as separate members from the second substrate module 122.

It should be noted that a sealing member 250 is provided around the second liquid crystal layer 272 between the third substrate 230 and the fourth substrate 240. The second liquid crystal layer 272 is formed in a space surrounded by the third substrate 230, the fourth substrate 240 and the sealing member 250.

An acute angle made between a third absorbing axis of the third polarizer P3 and a fifth direction (X1-axis direction) is equal to an acute angle made between a sixth direction (Y1-axis direction) perpendicular to the fourth direction and the fifth direction, and the third absorbing axis. The acute angle made between the third absorbing axis of the third polarizer P3 and the fifth direction (X1-axis direction) is, for example, 45 degrees (for example, 40 degrees or more but 50 degrees or less).

An acute angle made between a fourth absorbing axis of the fourth polarizer P4 and a fifth direction (X1-axis direction) is equal to an acute angle made between the fourth absorbing axis and the sixth direction (Y1-axis direction). The fourth absorbing axis is perpendicular to the third absorbing axis. The acute angle made between the fourth absorbing axis of the fourth polarizer P4 and the fifth direction (X1-axis direction) is, for example, 135 degrees (for example, 130 degrees or more but 140 degrees or less). An angle made between the fourth absorbing axis and the third absorbing axis is, for example, 85 degrees or more but 95 degrees or less.

The projection axis to a second plane (X1-Y1 plane) of the slow axis of the fifth retardation layer F5 is perpendicular to the fifth direction (X1-axis direction). That is, the angle made between the projection axis to the second plane (X1-Y1 plane) of the slow axis of the fifth retardation layer F5 and the fifth direction (X1-axis direction) is, for example, 85 degrees or more but 95 degrees or less.

The projection axis to the second plane (X1-Y1 plane) of the slow axis of the seventh retardation layer F7 is perpendicular to the fifth direction (X1-axis direction). That is, the angle made between the projection axis to the second plane (X1-Y1 plane) of the slow axis of the seventh retardation layer F7 and the fifth direction (X1-axis direction) is, for example, 85 degrees or more but 95 degrees or less.

The projection axis to the second plane (X1-Y1 plane) of the slow axis of the sixth retardation layer F6 is perpendicular to the third absorbing axis. That is, the angle made between the projection axis to the second plane (X1-Y1 plane) of the slow axis of the sixth retardation layer F6 and the X1-axis direction is, for example, 135 degrees (for example, 130 degrees or more but 140 degrees or less).

The retardation in the direction along the second plane (X1-Y1 plane) of the sixth retardation layer F6 should preferably be 20 nm or more but 120 nm or less, or more preferably, 40 nm or more but 90 nm or less.

The retardation in the direction along the fourth direction (Z1-axis direction) of the sixth retardation layer F6 should preferably be 40 nm or more but 140 nm or less, or more preferably, 60 nm or more but 120 nm or less.

The projection axis to the second plane (X1-Y1 plane) of the slow axis of the eighth retardation layer F8 is perpendicular to the fourth absorbing axis. That is, the angle made between the projection axis to the second plane (X1-Y1 plane) of the slow axis of the eighth retardation layer F8 and the X1-axis direction is, for example, 45 degrees (for example, 40 degrees or more but 50 degrees or less).

The retardation in the direction along the second plane (X1-Y1 plane) of the eighth retardation layer F8 should preferably be 20 nm or more but 120 nm or less, or more preferably, 40 nm or more but 90 nm or less.

The retardation in the direction along the fourth direction (Z1-axis direction) of the eighth retardation layer F8 should preferably be 40 nm or more but 140 nm or less, or more preferably, 60 nm or more but 120 nm or less.

It should be noted that, for example, the Z1-axis direction can be set in substantially parallel with the Z-axis direction, but the Z1-axis direction may not be strictly in parallel with the Z-axis direction. The relationship between the Z1-axis direction and the Z-axis direction may be arbitrary as long as the viewer is able to view the images through the liquid crystal shutter component 105 and the liquid crystal shutter component 106.

The X1-axis direction can be set in substantially parallel with the X-axis direction, but the X1-axis direction may not be strictly in parallel with the X-axis direction. The X1-axis direction may be the same as the X-axis direction, or it may be reverse to the X-axis direction.

The Y1-axis direction can be set in substantially parallel with the Y-axis direction, but the Y1-axis direction may not be strictly in parallel with the Y-axis direction. The Y1-axis direction may be the same as the Y-axis direction, or it may be reverse to the Y-axis direction.

In the liquid crystal shutter component 120 (liquid crystal shutter component 106) as well, the observation angle characteristics can be improved by a simple and special designing. When the liquid crystal shutter component 120 (liquid crystal shutter component 106) and the liquid crystal shutter component 110 (liquid crystal shutter component 105) already explained are combined together, the observation angle characteristics of the liquid crystal shutter glasses 101 can be improved by a simple and special designing.

According to this embodiment, a liquid crystal shutter component having a high display performance and liquid crystal shutter glasses which employ such an element can be provided.

With reference to specific examples, the embodiments have been explained above. However, these embodiments are not limited to these specific examples. For examples, with regard to the specific structure of each of the elements of the liquid crystal shutter component, that is, polarizers retardation layers, liquid crystal layer, substrate, electrodes and alignment films, and those of the liquid crystal shutter glasses, including holder, a person having ordinary skill in the art can select them from the conventionally known range as needed as long as embodiments can be similarly carried out and a similar effect can be obtained. Such structures are encompassed within the scope of the embodiments.

Further, those obtained by combining two or more elements of the specific examples within a technically possible range as well are included in the embodiment which encompasses the essence of the embodiments.

Moreover, all types of liquid crystal shutter components and liquid crystal shutter glasses which can be carried out with some changes in designing as needed by a person having ordinary skill in the art based on the above-described liquid crystal shutter components and liquid crystal shutter glasses as the embodiments fall within the scope of embodiments as long as they encompass the essence of the above-described embodiments.

Apart from the above, within the scope of the technical concept of the embodiments, a person having ordinary skill in the art would be able to conceive various types of modification and revision examples, and it is naturally understood that these modification and revision examples belong to the scope of the present embodiments.

The above-provided embodiments were explained in connection with liquid crystal shutter glasses as liquid crystal shutters which use liquid crystal shutter components. However, the liquid crystal shutter is not limited to the type which is mounted onto glasses, but it may be modified into various versions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal shutter component comprising:
a first polarizer;
a second polarizer;
a liquid crystal layer provided between the first polarizer and the second polarizer;
a first retardation layer provided between the first polarizer and the liquid crystal layer;
a second retardation layer provided between the first polarizer and the first retardation layer;
a third retardation layer provided between the second polarizer and the liquid crystal layer; and
a fourth retardation layer provided between the second polarizer and the third retardation layer,
wherein
a projection axis of a longitudinal axis of a liquid crystal molecule of the liquid crystal layer to a plane perpendicular to a first direction directed from the second polarizer to the first polarizer is along a second direction perpendicular to the first direction, and a liquid crystal orientation of the liquid crystal layer transitions between a plurality of bend orientation states different from each other, created depending on a voltage applied to the liquid crystal layer,
an acute angle made by a first absorbing axis of the first polarizer and the second direction is equal to an acute angle made by a third direction perpendicular to both of the first direction and the second direction, and the first absorbing axis,
a second absorbing axis of the second polarizer is perpendicular to the first absorbing axis,
a projection axis to the plane of a slow axis of the first retardation layer is perpendicular to the second direction,
a projection axis to the plane of the slow axis of the third retardation layer is perpendicular to the second direction, a projection axis to the plane of the slow axis of the second retardation layer is perpendicular to the first absorbing axis, a retardation in a direction along the plane of the second retardation layer is 20 nm or more and 120 nm or less, a retardation along the first direction of the second retardation layer is 40 nm or more and 140 nm or less, a projection axis to the plane of the slow axis of the fourth retardation layer is perpendicular to the second absorbing axis, a retardation in the direction along the plane of the fourth retardation layer is 20 nm or more and 120 nm or less, a retardation along the first direction of the fourth retardation layer is 40 nm or more and 140 nm or less.

2. A liquid crystal shutter comprising:

a liquid crystal shutter component for a left eye; and a liquid crystal shutter component for a right eye, aligned side by side with the liquid crystal shutter component for the left eye, the liquid crystal shutter component for the left eye comprising:

a first polarizer;

a second polarizer;

a first liquid crystal layer provided between the first polarizer and the second polarizer;

a first retardation layer provided between the first polarizer and the first liquid crystal layer;

a second retardation layer provided between the first polarizer and the first retardation layer;

a third retardation layer provided between the second polarizer and the first liquid crystal layer; and a fourth retardation layer provided between the second polarizer and the third retardation layer, wherein a projection axis of a longitudinal axis of a liquid crystal molecule of the first liquid crystal layer to a first plane perpendicular to a first direction directed from the second polarizer to the first polarizer is along a second direction perpendicular to the first direction, and a liquid crystal orientation of the first liquid crystal layer transitions between a plurality of bend orientation states different from each other, created depending on a voltage applied to the first liquid crystal layer, an acute angle made by a first absorbing axis of the first polarizer and the second direction is equal to an acute angle made by a third direction perpendicular to both of the first direction and the second direction, and the first absorbing axis, a second absorbing axis of the second polarizer is perpendicular to the first absorbing axis, a projection axis to the first plane of a slow axis of the first retardation layer is perpendicular to the second direction, a projection axis to the first plane of the slow axis of the third retardation layer is perpendicular to the second direction, a projection axis to the first plane of the slow axis of the second retardation layer is perpendicular to the first absorbing axis, a retardation in a direction along the first plane of the second retardation layer is 20 nm or more and 120 nm or less, a retardation along the first direction of the second retardation layer is 40 nm or more and 140 nm or less, a projection axis to the first plane of the slow axis of the fourth retardation layer is perpendicular to the second absorbing axis, a retardation in the direction along the first plane of the fourth retardation layer is 20 nm or more and 120 nm or less, a retardation along the first direction of the fourth retardation layer is 40 nm or more and 140 nm or less, and the liquid crystal shutter component for the right eye comprising:

a third polarizer;

a fourth polarizer;

a second liquid crystal layer provided between the third polarizer and the fourth polarizer;

a fifth retardation layer provided between the third polarizer and the second liquid crystal layer;

a sixth retardation layer provided between the third polarizer and the fifth retardation layer;

a seventh retardation layer provided between the fourth polarizer and the second liquid crystal layer; and an eighth retardation layer provided between the fourth polarizer and the seventh retardation layer, wherein a projection axis of a longitudinal axis of a liquid crystal molecule of the second liquid crystal layer with respect to a second plane perpendicular to a fourth direction directed from the fourth polarizer to the third polarizer is along a fifth direction, which is perpendicular to the fourth direction, and a liquid crystal orientation of the second liquid crystal layer transitions between a plurality of bend orientation states different from each other, created depending on a voltage applied to the second liquid crystal layer, an acute angle made between a third absorbing axis of the third polarizer and the fifth direction is equal to an acute angle made between a sixth direction perpendicular to the fourth direction and the fifth direction, and the third absorbing axis, a fourth absorbing axis of the fourth polarizer is perpendicular to the third absorbing axis, a projection axis to the second plane of the slow axis of the fifth retardation layer is perpendicular to the fifth direction, a projection axis to the second plane of the slow axis of the seventh retardation layer is perpendicular to the fifth direction, a projection axis to the second plane of the slow axis of the sixth retardation layer is perpendicular to the third absorbing axis, a retardation in a direction along the second plane of the sixth retardation layer is 20 nm or more but 120 nm or less, a retardation along the fourth direction of the sixth retardation layer F6 is 40 nm or more but 140 nm or less, a projection axis to the second plane of the slow axis of the eighth retardation layer F8 is perpendicular to the fourth absorbing axis, a retardation in the direction along the second plane of the eighth retardation layer is 20 nm or more but 120 nm or less, and a retardation in the direction along the fourth direction of the eighth retardation layer is 40 nm or more but 140 nm or less.

* * * * *